United States Patent [19]

Updike

[11] Patent Number: 5,542,205
[45] Date of Patent: Aug. 6, 1996

[54] AUTOMATIC HOOK SETTING FISHING POLE HOLDER

[76] Inventor: Lester Updike, 3730 N. Linder, Meridian, Id. 83642

[21] Appl. No.: 339,594

[22] Filed: Nov. 14, 1994

[51] Int. Cl.⁶ .................................................. A01K 97/12
[52] U.S. Cl. ................................................. 43/15; 43/21.2
[58] Field of Search ................................. 43/15, 16, 21.2

[56] References Cited

U.S. PATENT DOCUMENTS

| | | | |
|---|---|---|---|
| 693,071 | 2/1902 | Ruud | 43/15 |
| 2,804,277 | 8/1957 | Kinder | 43/21.2 |
| 2,944,361 | 7/1960 | Coulter | 43/16 |
| 3,412,499 | 11/1968 | Postrovich | 43/15 |
| 3,777,389 | 12/1973 | DeMino | 43/15 |
| 3,977,117 | 8/1976 | Zahner | 43/15 |
| 4,344,248 | 8/1982 | Brophy et al. | 43/15 |
| 4,476,645 | 10/1984 | Paarmann | 43/15 |
| 4,677,783 | 7/1987 | Cratsa | 43/15 |
| 4,750,286 | 6/1988 | Gray | 43/15 |
| 5,050,332 | 9/1991 | Cross | 43/15 |
| 5,076,001 | 12/1991 | Coon et al. | 43/15 |

FOREIGN PATENT DOCUMENTS

| | | | |
|---|---|---|---|
| 2230181 | 1/1974 | Germany | 43/15 |

*Primary Examiner*—Jack W. Lavinder
*Assistant Examiner*—James Miner
*Attorney, Agent, or Firm*—Frank J. Dykas

[57] ABSTRACT

The invention is an improved fishing pole holder and automatic hook setting device with an improved latch release mechanism. A fishing pole holder arm pivotally mounted on a vertical support member is held in a generally horizontal and cocked fishing position against the tension of a spring interconnecting the holder arm and the vertical support member by means of a latch mechanism. The latch mechanism is a roller nut rotatably attached to the holder arm and a pawl-ended latch arm pivotally interconnected to the vertical support member. A trigger arm pivotally attached to the vertical support member, when pivoted forward by a tug on the fish line acts to disengage the pawl from the roller nut by means of a link arm interconnecting the trigger arm and the latch arm. When the pawl disengages from the roller nut the holder arm rotates suddenly upward under the action of the spring, setting the hook in the fish's mouth. The force necessary to trigger the device can be varied by means of an adjustment screw which protrudes from the pawl face and thus presents a barrier to disengaging the roller nut from the pawl and tripping the device.

11 Claims, 5 Drawing Sheets

5,542,205

AUTOMATIC HOOK SETTING FISHING POLE HOLDER

BACKGROUND OF THE INVENTION

TECHNICAL FIELD

This invention relates to fishing equipment, and more particularly to devices for holding fishing rods and automatically setting the hook thereon in response to the tug of the fish.

BACKGROUND

The prior art discloses many devices for supporting a fishing rod and for automatically setting the fish hook in the mouth of the fish when the fish bites. These devices usually rely on a hook and pawl latch mechanism which holds the fishing pole down against spring tension. A tug on the line by a biting fish releases the latch mechanism, jerking the pole upward under spring tension and thus setting the hook in the mouth of the fish. However, many of these devices are of complex structure, making them difficult to use. Furthermore, while many of the devices are adjustable with respect to the amount of force or tug on the line necessary to trip their latch mechanisms, most permit only a limited number of discreet force settings.

It is therefore an object of the present invention to provide a fishing pole holder and automatic hook setting device of simple structure which is easy to set up. It is a further object to provide a fishing pole holder and automatic hook setting device which is continuously adjustable over a range of trigger forces.

Objects, advantages and novel features of the invention will be set forth in part in the description which follows, and in part will become apparent to those skilled in the art upon examination of the following, or may be learned by the practice of the invention. The objects and advantages of the invention may be realized and attained by means of the instrumentalities and combinations particularly pointed out in the appended claims.

DISCLOSURE OF INVENTION

According to the present invention, the foregoing and other objects and advantages are attained by a device consisting essentially of a fishing rod holder arm pivotally attached to a vertical support member, the holder arm being tensioned to rotate upward on a generally counter clockwise direction under the action of a spring which interconnects the holder arm and the vertical support member. The holder arm is held in a generally horizontal or cocked fishing position by means of a latch arm and associated pawl which engage a roller nut attached to the holder arm. The roller nut is forwardly displaced from the holder arm pivot. The latch arm and pawl are displaced a like distance from the holder arm pivot, the latch arm being pivotally attached to a support arm protruding from the vertical support member. A generally vertical trigger arm is pivotally mounted to the vertical support member and acts to disengage the pawl from the roller nut via the action of a movable link arm pivotally attached to the both the trigger arm and the latch arm. The attachment pivot of the trigger arm to the vertical support member is at the lower end of a trigger arm, while the upper end of a trigger arm is provided with a notch for receiving the fishing line.

When the fishing pole and holder arm are in the generally horizontal fishing, or cocked, position, the pawl engages the roller nut to prevent the holder arm from swinging upward under the tension of the spring. Rotation of the trigger arm translates the link arm and rotates the connected latch arm about its pivot. Sufficient rotation of the trigger arm will cause the pawl to disengage from the roller nut and allow the holder arm to rotate suddenly, or "jerk," upward under the action of the spring.

The pawl is provided with an adjustment screw which pierces the pawl and protrudes normally from its lower face, presenting a barrier to disengaging the roller nut from the pawl. The adjustment screw thus varies the amount of force necessary to trip the device.

To use the device, the vertical support member's lower end is shoved into the ground, maintaining the device in a generally vertical or upright position. The adjustment screw on the pawl is set for the desired trigger force. The fishing pole is inserted in the holder arm, and the holder arm front end is rotated forward while the trigger arm is pushed forward until the pawl engages the roller nut and the holder arm is maintained in a generally horizontal fishing position. Sufficient slack is taken in the fishing line to allow the fishing line to be hooked around the notch in the trigger arm. When a fish bites on the fishing line, the trigger arm will rotate forward and, via the link arm, will cause the pawl to disengage from the roller nut. Once the pawl is disengaged from the roller nut, the holder arm will rotate suddenly upward under the action of the spring, setting the hook in the fish's mouth.

The roller nut and pawl latching mechanism and associated trigger mechanism of the invention thus provide a simple way for automatically setting the hook in the mouth of a fish when the fish bites. The pawl's adjustment screw provides an easy and continuous means of adjusting the force necessary to trip the mechanism.

BEST MODE FOR CARRYING OUT INVENTION

Figure 1:
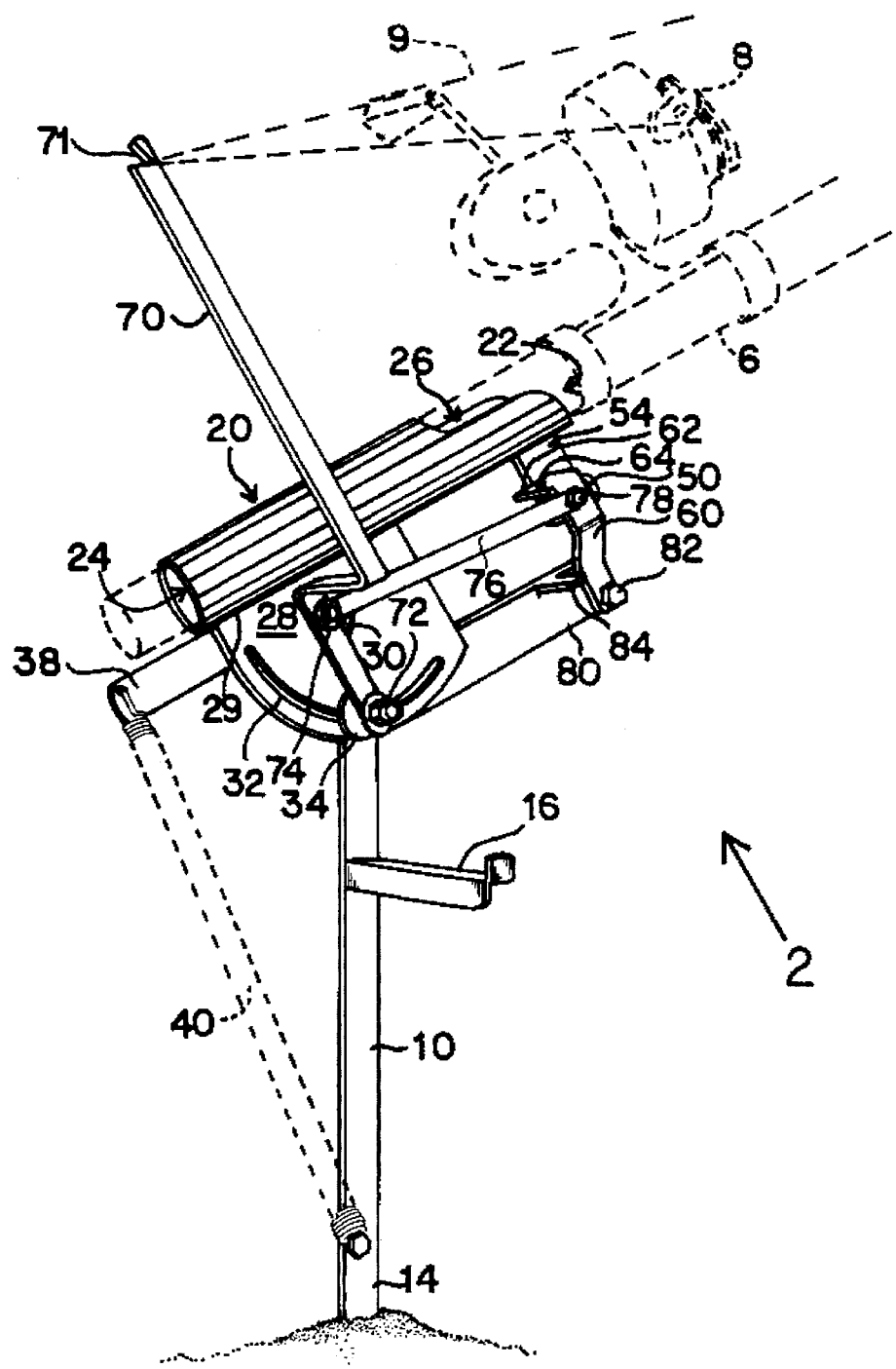
FIG. 1 is a perspective representational view of the fishing pole holder of the present invention placed in the ground with fishing pole inserted and the trigger and latch mechanism set.

Referring to the drawings in detail, my new fishing pole holder 2 includes a vertical support member 10 to which the remainder of the apparatus is attached. In the preferred embodiment, vertical support member 10 is formed of steel, approximately ⅛" thick, and is L-shaped in cross section.

However, in other embodiments, vertical support member 10 could have other cross sectional shapes, such as U or square shaped, and could be made of other materials, such as plastic or composites. It should be noted that all structural members of the preferred embodiment invention are made of steel ranging from 1/16" to 1/4" thick to provide a strong, durable device. However, the employment of other materials is within the scope of this invention.

In the preferred embodiment, vertical support member 10 is designed to be inserted part way into the ground near a lake or river for fishing, and is therefore configured with a pointed end 14 and a foot rest 16, which is rigidly mounted to vertical support member 10 and protrudes out from vertical support member 10. Foot rest 16 is for use in helping to push vertical support member 10 part way into the ground. In other embodiments of the invention, vertical support member 10 might be provided with brackets or the like for securing the apparatus in other ways, such as to a structure of a boat.

Figure 2A:
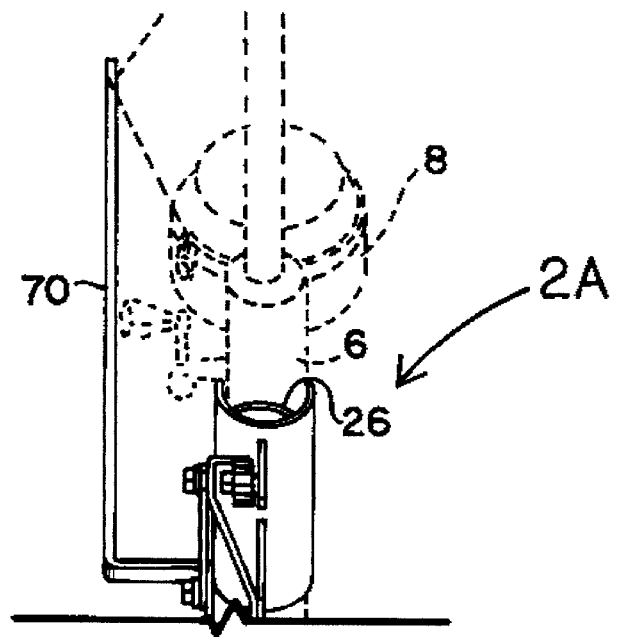
FIG. 2A is a front elevation view showing the holder arm slot for receiving the fishing pole.
Figure 2B:
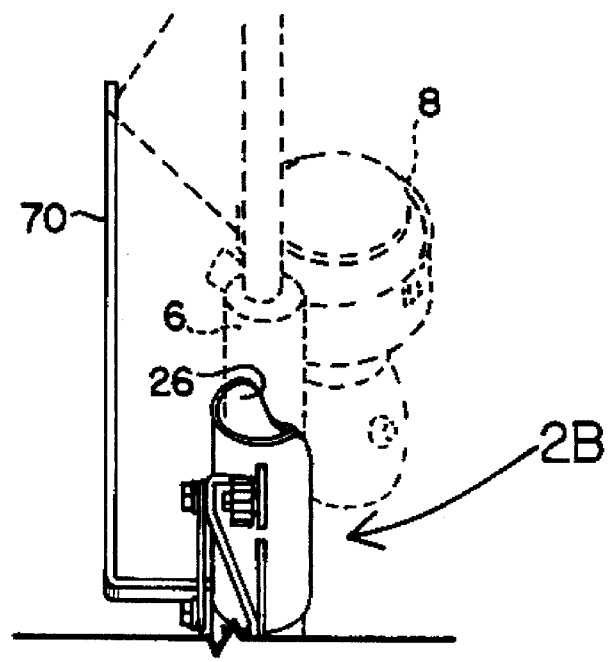
FIG. 2B is a front elevation view showing the holder arm slot facing to the side of the holder arm.
Figure 3:
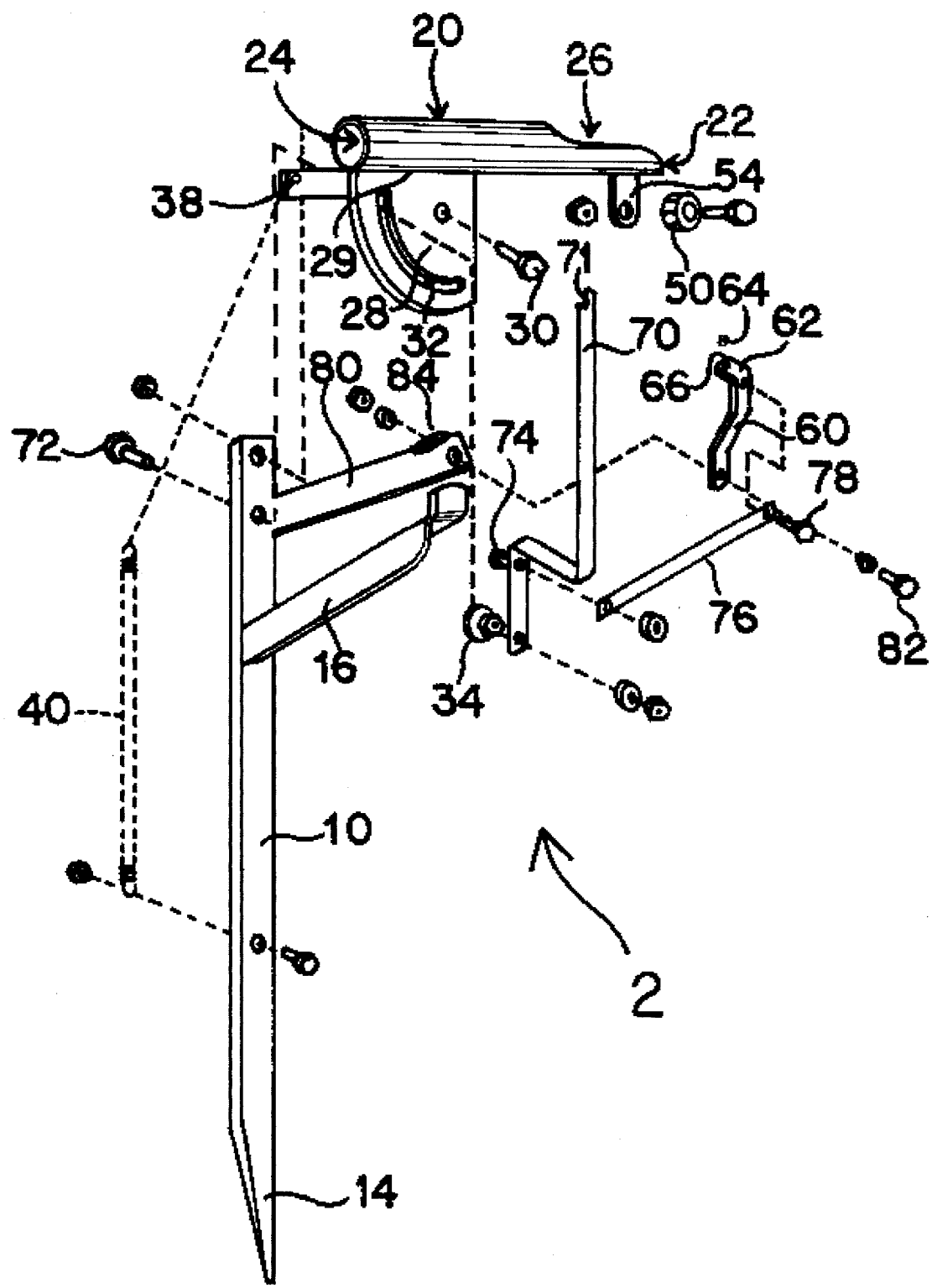
FIG. 3 is an exploded perspective view of the fishing pole holder.

A fishing pole receiver, identified as holder arm 20, is provided to receive and hold a fishing pole. In the preferred embodiment, holder arm 20 is a cylinder or tube having receiving end 22 and back end 24. Both receiving end 22 and back end 24 are open to permit insertion of a fishing pole. As shown in FIG. 2A, receiving end 22 contains an elemental slot or cut out 26 to permit easier insertion of the fishing pole. In the preferred embodiment the slot 26 faces to one side of holder arm 20, as shown in FIG. "2B" to prevent the fishing pole reel 8 from interfering with trigger arm 70.

In the preferred embodiment holder arm 20 is pivotally interconnected with vertical support member 10 by means of swivel plate 28, although other means of pivotally attaching holder arm 20 to vertical support member 10 are within the scope of this invention. Swivel plate 28 is a thin lamina having plan form shape of a quarter circular disk. Swivel plate 28 is pivotally attached to vertical support member 10 at pivot pin 30. Swivel plate 28 contains arcuate swivel plate slot 32, which permits relative motion between swivel plate 28 and second pivot pin 72 as swivel plate 28 rotates about pivot pin 30. Bushing 34, a metal washer in the preferred embodiment, is interdisposed between swivel plate 28 and trigger arm 70 at pivot pin 72.

Holder arm 20 is rigidly and elementally attached to swivel plate 28 at swivel plate edge 29. Thus, holder arm 20 rotates along with swivel plate 28 as swivel plate 28 pivots about pivot pin 30.

Spring 40 interconnects vertical support member 10 and swivel plate 28, to produce a counter-clockwise rotational force on swivel plate 28 which tends to urge front end 22 of holder arm 20 upward. In the preferred embodiment, spring 40 is a metal coil spring, but other resilient tension means could be used, such as an elastomeric member. Alternatively, a coil spring at pivot pin 30 could be used to provide rotational tension between swivel plate 28 and vertical support member 10. In the preferred embodiment, spring member 40 is attached to swivel plate 28 via extension arm 38, which is a rigid coplanar extension of swivel plate 28. Extension arm 38 increases the elongation and hence the tension on spring 40.

Trigger arm 70 is pivotally connected to vertical support member 10 at pivot pin 72, and extends generally upward therefrom. A notch 71 is provided in the upper end of trigger arm 70, about which the fishing line is hooked when setting the device.

Roller nut 50 is rotatably attached to bracket 54, which extends normally from holder arm 20 such that the axis of rotation of roller nut 50 is perpendicular to the central axis of holder arm 20. Pawl 62 is a plate rigidly and generally normally attached to the top of latch arm 60. Pawl 62 is configured to engage and restrain roller nut 50 and thereby prevent roller nut 50, and with it holder arm 20, from rotating upward under the action of spring 40. In the preferred embodiment, pawl 62 is angled with respect to latch arm 60 as appropriate for smooth disengagement from roller nut 50.

Roller nut 50 is preferably a common sealed roller bearing. However, any type of circular bearing or wheel may be utilized. Furthermore, in other embodiments the positions of pawl 62 and roller nut 50 may be interchanged, with pawl 62 being attached to holder arm 20, while roller nut 50 is attached to latch arm 60.

Figure 5:
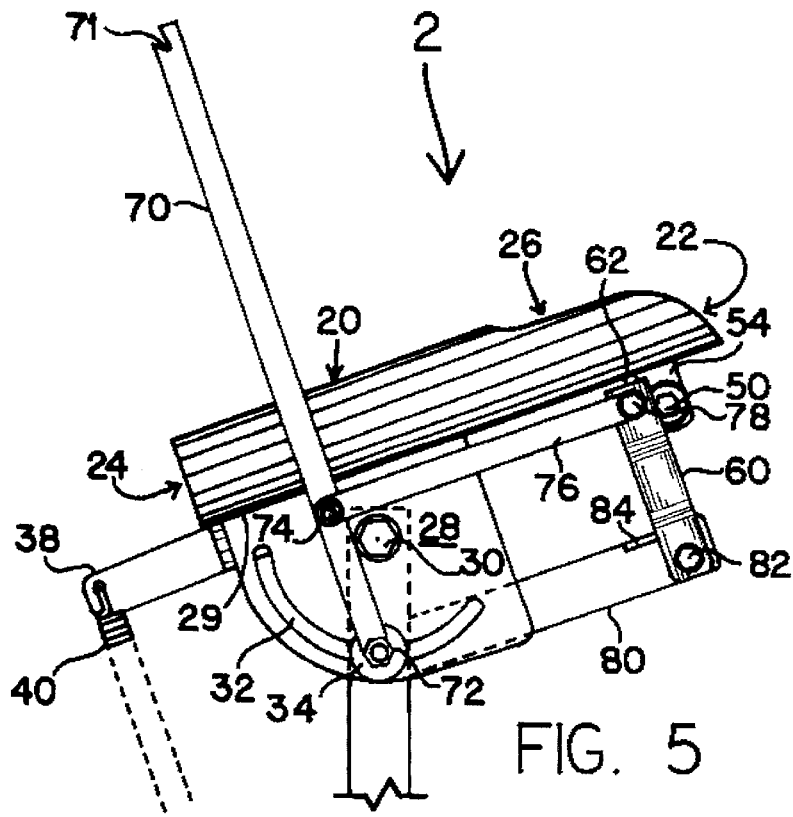
FIG. 5 is a side elevation view of the fishing pole holder in the cocked position.

Support arm 80 extends out from vertical support member 10 and rotatably supports latch arm 60 at pivot pin 82. The angle of support arm 80 with respect to vertical support member 10, such that an appropriate fishing angle for fishing pole 6 is established when holder arm 20 is in the cocked position, with pawl 62 "latched" to roller nut 50, as shown in FIG. 5. Link arm 76 is pivotally attached to trigger arm 70 at pivot pin 74 and to latch arm 60 at pivot pin 78, and is generally parallel to support arm 80 in the preferred embodiment. Thereby is formed a modifiable translation quadrangle between fixed pivot pins 72 and 82 and translatable pivot pins 74 and 78. This quadrangle permits trigger arm 70, when it rotates about pivot pin 72, to cause translation of pawl 62 relative to roller nut 50 and thus trigger the hook setting apparatus. Support arm 80 is provided with stop tab 84 for keeping the quadrangle generally in position for engaging pawl 62 and roller nut 50 to set the device.

Figure 4A:
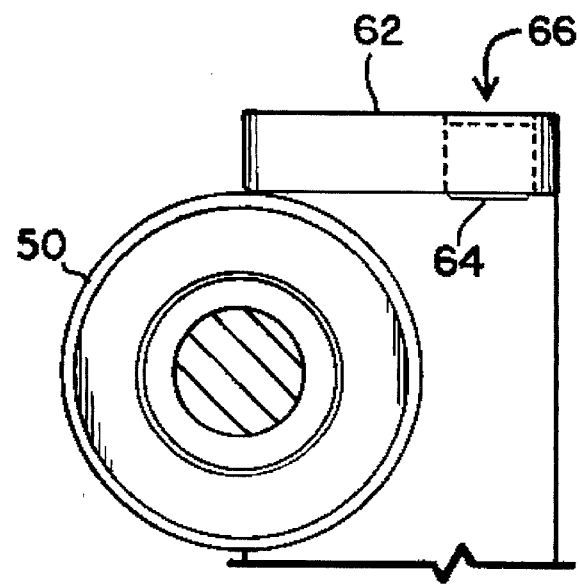
FIG. 4A is a is a side elevation view showing a detail of the latch mechanism.
Figure 4B:
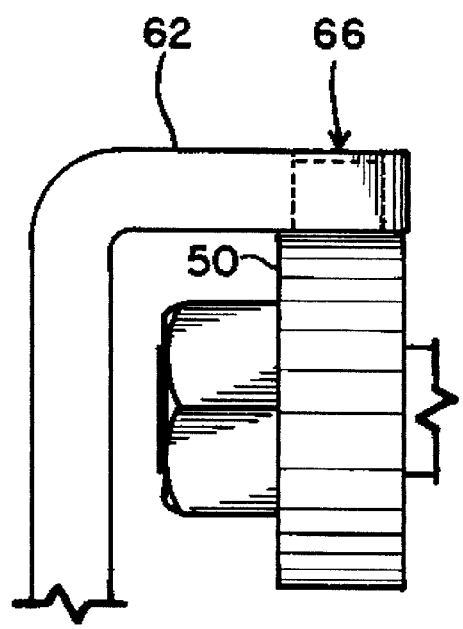
FIG. 4B is a front elevation view thereof.

Referring specifically to FIGS. 4A and 4B, in the preferred embodiment of the invention an adjustment screw 64 is threaded through hole 66 in pawl 62. Adjustment screw 64 varies the amount of force necessary to translate pawl 62 relative to roller nut 50 based on the distance that adjustment screw 64 protrudes below the lower surface of pawl 62. The more that adjustment screw 64 protrudes below the lower surface of pawl 62, the more of a nub or hump that roller nut 50 must overcome in translating relative to pawl 62 to trip the mechanism. While in the preferred embodiment a common allen head metal set screw is used for adjustment screw 64, other types of screws or protrusions may be used to adjust the trigger force.

In the preferred embodiment, forward positioning of pawl 62 and roller nut 50 distant from trigger arm 70 in a direction parallel to the central axis of holder arm 20 decreases the spring torque-induced force on pawl 62 and thus the force necessary to translate pawl 62 and roller nut 50 relative to each other to trip the apparatus. Similarly, the distance between notch 71 and pivot pin 72 may be varied to change the trigger leverage and hence the force necessary to rotate trigger arm 70 and thus trip the apparatus. Likewise, the length of arm 38 may be varied and the spring constant of spring 40 be changed to adjust both the force necessary to trip the apparatus and the torque rotating holder arm member 20 upward after tripping. By adjustment of the foregoing dimensions, member locations and spring constant, may embodiments of the invention be manufactured which are appropriate for various classes and sizes of fish.

To use the device, the lower end 14 of vertical support member 10 is first inserted into the ground. Foot rest 16 may be pushed by hand or foot to aid in the insertion. Adjustment screw 64 is adjusted to provide the desired amount of force necessary to trip the device. Fishing pole 6 is inserted into holder arm member 20. Then fishing pole 6 and the front end of holder arm 20 are rotated forward and trigger arm 70 is pushed forward until pawl 62 engages roller nut 50. Sufficient slack in fishing line 9, connected to fishing pole 6, is then taken to permit the fishing line to be hooked around notch 71. In this position, shown in FIG. 5, pawl 62 holds roller nut 50, and with it holder arm member 20, in place and prevents these members from rotating upward under the force of spring 40.

Figure 6:
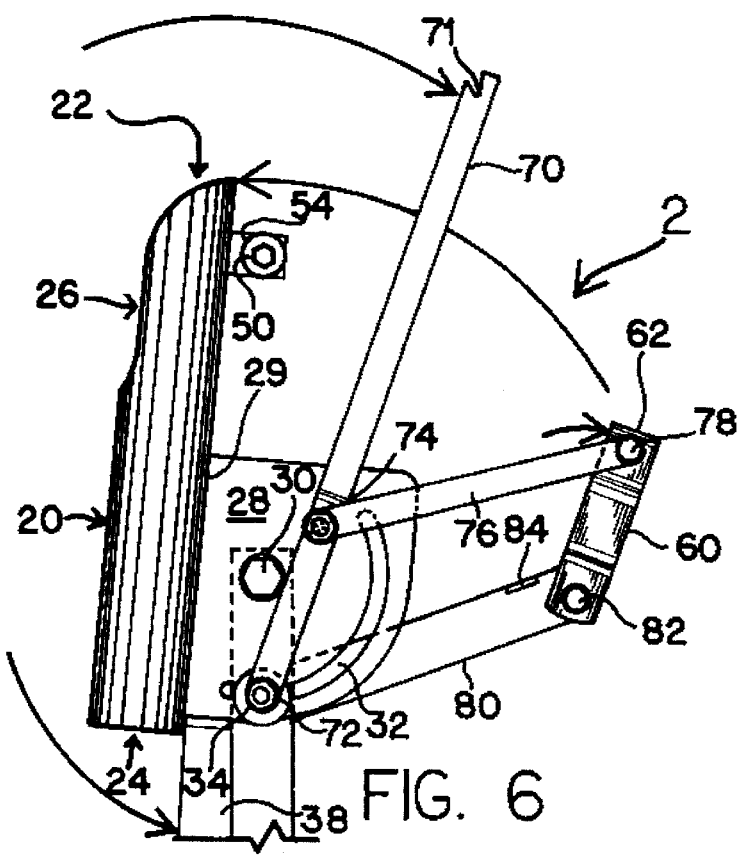
FIG. 6 is a side elevation view of the fishing pole holder in the tripped position with arrows indicating the motion of selected structural elements of the invention during tripping.

When a fish bites on fishing line 9, trigger arm 70 will rotate forward about pivot pin 72. As trigger arm 70 rotates forward, it forces link arm 76 to translate forward, causing latch arm 60 to rotate about pivot pin 82, and pawl 62 to disengage from roller nut 50. As this disengagement occurs, the force exerted by spring 40 on arm 38 in a generally downward direction, will cause roller nut 50 and holder arm 20, and with them fishing pole 6, to rotate suddenly upward, that is, to pivot about pivot pin 30 as indicated by the arrows in FIG. 6. This sudden rotation or jerk sets the fishing line hook in the fish's mouth.

While there is shown and described the present preferred embodiment of the invention, it is to be distinctly understood that this invention is not limited thereto but may be variously embodied to practice within the scope of the following claims.

I claim:

1. An automatic hook setting fishing rod holder comprising:
   (a) a vertical support member having upper and lower ends;
   (b) a holder arm member pivotally attached to the vertical support member, and having a forward end;
   (c) spring means interconnected between the vertical support member and the holder arm member for urging the forward end of the holder arm member upward;
   (d) latching means, including a roller nut attached to the holder arm member and a pawl formed of a plate extending generally normal from a latch arm pivotally connected to a support arm fixedly attached to the vertical support member, for restraining upward motion of the forward portion of the holder arm member until the roller nut is disengaged from the pawl, and latch adjustment means for varying the force necessary to disengage the roller nut from the pawl;
   (e) trigger means pivotally attached to the vertical support member for disengaging the roller nut from the pawl.

2. The automatic hook setting fishing rod holder of claim 1 wherein the holder arm member is an annular cylinder with open ends, the forward end having an elemental slot for ease of receiving a fishing pole.

3. The automatic hook setting fishing rod holder of claim 1 wherein the vertical support member's lower end is pointed and the vertical support member has a footrest extending therefrom.

4. The automatic hook setting fishing rod holder of claim 1 wherein the spring means is a common metal coil spring.

5. The automatic hook setting fishing rod holder of claim 1 wherein the latching means is displaced in a forward direction along the central axis of the holder arm member from the trigger means pivot.

6. The automatic hook setting fishing rod holder of claim 1 wherein the roller nut is a sealed roller bearing rotatably attached to the holder arm member.

7. The automatic hook setting fishing rod holder of claim 1 wherein the latch adjustment means comprises a movable screw threaded normally through the pawl for presenting a variable barrier to disengaging the roller nut.

8. The automatic hook setting fishing rod holder of claim 7 wherein a link arm interconnects the trigger means and the latch arm, the link arm being pivotally attached to both the trigger means and latch arm, for displacing the pawl relative to the roller nut.

9. The automatic hook setting fishing rod holder of claim 8 wherein the link arm is generally parallel to the central axis of the holder arm member.

10. The automatic hook setting fishing rod holder of claim 8 wherein the trigger means is a rod extending generally upward from its pivotal attachment to the vertical support member with a notch for receiving a fishing line, and which rod rotates about its pivot point in response to a tug on the fishing line.

11. The automatic hook setting fishing rod holder of claim 10 wherein there is formed a quadrangle by the pivotal attachment point of the trigger means to the vertical support member, the pivotal attachment point of the latch arm to the support arm, and the translatable pivotal attachment points of the link arm to the trigger means and the latch arm, for translation and operable release of the pawl from the roller nut.

* * * * *